3,235,515
METHOD OF PREPARING A HYDROGENATION CATALYST COMPOSITION CONSISTING OF THE OXIDES OF ZIRCONIUM AND AN IRON GROUP METAL
James Earl Taylor, Louisville, Ky., assignor to Chemetron Corporation, Chicago, Ill., a corporation of Delaware
No Drawing. Filed Apr. 27, 1962, Ser. No. 190,783
5 Claims. (Cl. 252—472)

This invention relates to a method of producing highly active nickel and cobalt hydrogenation catalysts. More particularly, this invention relates to a method of producing nickel and cobalt catalysts which are promoted by zirconium compounds and to catalysts so produced. Such catalysts are highly active hydrogenation catalysts, particularly for the hydrogenation of unsaturated organic compounds, such as unsaturated fats and oils.

It is known that the activity of nickel and/or cobalt catalysts can be increased or promoted by association with a relatively minor proportion of zirconium dioxide. The usual practice in making a zirconium-promoted nickel or cobalt cataylst is to add an aqueous solution of sodium carbonate to an aqueous solution containing a soluble salt of nickel or cobalt and a soluble salt of zirconium. In this way a precipitate containing nickel or cobalt carbonate and zirconium carbonate is formed and it is removed by filtration, washed and dried, then calcined and reduced with hydrogen at elevated temperature to form metallic nickel or cobalt in the presence of the zirconium dioxide. It has been found, however, that this precipitation procedure, which has been commonly used, does not produce catalysts of optimum activity because the nickel or cobalt carbonates and the zirconium carbonate do not precipitate simultaneously and therefore, there is not an intimate association of the promotor metal with the catalytic metal.

In an attempt to produce more active nickel catalysts Hawley, Patent No. 2,564,331, August 14, 1951, described a procedure for copreciptating nickel carbonate with zirconium carbonate. This procedure involved adding an aqueous solution of zirconium sulfate to a large excess of a warm aqueous solution of sodium carbonate whereby the basic zirconium derivative which first precipitated was redissolved, thereby forming a solution containing zirconium ions in the presence of a large excess of carbonate ions. This step was followed by the addition of an aqueous solution of nickel sulfate to the carbonate solution containing the zirconium, at a temperature of 165° F. This caused the formation of a precipitate of mixed nickel and zirconium carbonate, which was washed, dried and calcined, and formed a catalyst which, after hydrogenation to reduce the nickel oxide to nickel metal, was reported to be more active than comparable zirconium-promoted nickel catalysts produced by precipitation of the carbonates from a common solution of the nickel and zirconium sulfates.

I have discovered an improved procedure for producing zirconium-promoted nickel or cobalt catalysts which provides highly active hydrogenation catalysts. This improved procedure involves the coprecipitation of basic nickel or cobalt carbonate with basic zirconium carbonate from an ammonium carbonate solution containing both zirconium ions and nickel or cobalt ions. In accordance with this invention an aqueous solution of ammonium zirconyl carbonate is admixed with an ammoniacal carbonate solution of catalytic metal (i.e., nickel or cobalt) without precipitating zirconium compounds. Then, part of the ammonia and carbon dioxide present in the ammoniacal carbonate solution containing zirconium and the catalytic metal are removed by evaporation and the zirconium basic carbonate is coprecipitated with the catalytic metal basic carbonate in intimate mixture. The resultant precipitate after drying and/or calcination can be reduced with hydrogen to form catalysts which are highly active for hydrogenation procedures.

It is an object of this invention to provide an improved procedure for the production of highly active zirconium-promoted nickel or cobalt hydrogenation catalysts. It is another object to provide zirconium-promoted nickel and cobalt catalysts when made by the improved procedure. A further object is to provide an improved procedure for producing zirconium-promoted nickel and cobalt catalysts by coprecipitating basic zirconium carbonate and basic nickel (or cobalt) carbonate from an aqueous ammonium carbonate solution containing zirconium and nickel (or cobalt) ions. These and other objects are apparent from and are achieved in accordance with the following disclosure.

The addition of comparatively small amounts of zirconium increases the activity of nickel or cobalt catalysts. This effect is especially pronounced when zirconium-promoted nickel catalysts prepared in accordance with this application are used for hydrogenation of unsaturated fats and oils at comparatively low temperatures, for example, at 255° F. Likewise, cobalt catalysts promoted with zirconium produced in accordance with this invention are more active than unpromoted cobalt catalysts. The promoter effect of the zirconium on the nickel or cobalt hydrogenation catalysts is most marked when the amount of the zirconium compound (calculated as zirconium metal) is in the range of 2% to 10% of the amount of nickel or cobalt in the catalyst.

The catalysts can be supported on inert carriers such as kieselguhr, pumice, silica or activated clay, or the catalytic metals can be used as such without inert supports for carriers. For example, the ziconium-promoted nickel catalyst produced by calcination of the precipitate of nickel basic carbonate and zirconium basic carbonate, calcination of mixed carbonates and reduction of the nickel with hydrogen can be dispersed in molten hydrogenated vegatable oil and the mass chilled and solidified into flakes or pellets suitable for use in the hardening of vegetable oils.

In the production of catalysts in accordance with this invention the source of nickel or cobalt is preferably metallic nickel powder or metallic cobalt powder of high purity. The preferred procedure of preparing the nickelammine or cobaltammine carbonate solutions is described in the Dean and Taylor application Serial No. 843,645. The metal powder is suspended in an aqueous solution of ammonium and ammonium carbonate and treated with a stream of oxygen (or air) at a temperature in the range of 60° F. to 140° F. The metal is oxidized and converted into a soluble nickelammine carbonate or cobaltammine carbonate according to the equations

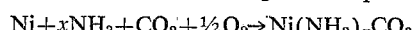
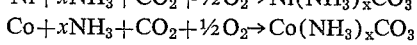

wherein $x$ is at least 2 and preferably 6. The nickelammine carbonate or cobaltammine carbonate solution is then separated from the undissolved metal and admixed with ammonium zirconyl carbonate solution, the quantity of the latter being selected so that the amount of zirconium is in the range of 2% to 10% the amount of nickel or cobalt in the resulting solution. The nickelammine carbonate or cobaltammine carbonate and ammonium zirconyl carbonate compounds are mutually soluble and remain in solution as the metal ammonium carbonates. The coprecipitation of the basic metal carbonates is accomplished by adjusting the amount of ammonia and carbon dioxide in the solution containing the zirconium and nickel or cobalt, preferably by evaporation at a temperature of 180° F. or higher. As the amount of ammonia and carbon dioxide in the solution is reduced, there is formed a precipitate containing basic zirconium carbonate and nickel basic carbonate or cobalt basic carbonate. The combination of two metals forms a basic metal carbonate from the solution containing the two metals. If it is desired to support these catalysts on a carrier, the carrier material, for example, kieselguhr or diatomaceous silica in finely divided form, is suspended in the solution containing the zirconium and nickel or cobalt in the form of the ammine carbonates and as the coprecipitation of the metals occurs, the basic metal carbonates are deposited on the particles of the carrier forming an intimate mixture on the surface thereof. The mixed metal carbonates are then converted to mixed metal oxides by calcination.

Calcination temperature for the catalysts of this invention is in the range of 250–1000° F., the preferred range being 600–700° F.

The aqueous solution in which the nickel or cobalt is dissolved should contain about 6% to 10% ammonia ($NH_3$) by weight although higher concentrations of ammonia up to about 15% are suitable. Above 15% the loss of ammonia is excessive in most applications. The aqueous solution should also contain about 2% to 10% carbon dioxide by weight. With such aqueous solutions, concentrations of nickel or cobalt of 1–5% by weight are readily obtained from the metals. The concentration of nickel or cobalt in the final solution, after addition of ammonium zirconyl carbonate solution, should be in the range of 0.1% to 5% by weight and preferably about 1%. The amount of carrier, if used, can vary from about 1/10 to ten times the weight of the nickel or cobalt in the solution. It generally amounts to 8 to 45 grams of carrier per gallon of nickelammine carbonate solution or cobaltammine carbonate solution.

The coprecipitation of the basic zirconium carbonate and basic nickel carbonate or basic cobalt carbonate is ordinarily conducted at a temperature in the range of 200° F. to 220° F. at a pressure of about 1 atmosphere. If reduced, pressure is used, the precipitation can be conducted at lower temperatures in the range of 180° F. to 200° F. The heating is preferably done with live steam which will drive off some of the excess ammonia, thereby sightly lowering the pH and aiding in the decomposition of the nickelammine or cobaltammine complex and causing basic nickel carbonate or basic cobalt carbonate to precipitate with the basic zirconium carbonate. The precipitate of basic zirconium carbonate and basic nickel carbonate or basic cobalt carbonate, with or without the inert carrier, is removed by filtration and no washing is needed in order to prepare a satisfactory catalyst. The filter cake is dried at a temperature up to about 250° F. and then calcined at a temperature in the range of 250° F. to 1000° F. or it may be directly calcined at 250° F. to 1000° F. During the calcination the basic nickel carbonate or basic cobalt carbonate is decomposed to nickel oxide or cobalt oxide, respectively, and the zirconium compound is converted to zirconium dioxide ($ZrO_2$). The calcined catalyst may be pelleted, particularly if it is supported on an inert carrier. The nickel or cobalt oxide is then reduced to nickel or cobalt by hydrogen at 600–1100° F., the preferred range being 750°–950° F. The reduced catalyst may be suspended in molten vegetable oil or it may be stabilized by treatment with a stream of inert gas containing controlled quantities of oxygen as disclosed in the application of Chester L. Pedigo, Serial No. 815,064 (now Patent No. 3,033,802).

Nickel and cobalt catalysts prepared in accordance with this invention show greatly improved activity in the hydrogenation of unsaturated vegetable oils. Not only are the catalysts more effective in producing rapid hydrogenation of unsaturated oils, but they also induce the reaction of lower temperatures. For instance, a nickel catalyst promoted with the addition of 2% zirconium permitted hydrogenation of cottonseed oil at 255° F. whereas a similar catalyst made by the same procedure, but without the addition of zirconium, had poor initial activity in the hydrogenation of cottonseed oil and a temperature of 295° F. was required for the reaction.

The activity of hydrogenation catalyst is expressed as the time required for a catalyst containing nickel or cobalt to hydrogenate the unsaturates present in cottonseed oil so as to change the refractive index from approximately 1.4618 to 1.4567 at 295° F., under standard conditions with the amount of catalytic metal (i.e., nickel or cobalt) being 0.05% of the weight of cottonseed oil, in a hydrogenation vessel having an agitator operating at 3600 r.p.m. and with a hydrogen flow rate of 750 cc. per minute at atmospheric pressure in a glass reactor. The refractive index drop corresponds to an iodine value change from approximately 106 to 63. With cottonseed oils of different starting refractive indices, the time required to decrease the refractive index 0.0051 constitutes the activity value of the catalyst. The hydrogenation reaction was carried out in a glass reactor made of a 70-mm. diameter Pyrex tubing with a round bottom, height of approximately 5 inches. The agitator was a stainless steel open-tube paddle stirrer. The temperature was maintained by a thermal regulator to control the temperature ±3° F. The cottonseed oil used in the test was bleached, refined, undeodorized cottonseed oil having a refractive index of 1.46185±0.00007. The hydrogenations were conducted at 295±3° F. under atmospheric pressure. The amount of catalyst was 0.05% by weight of nickel, based upon the weight of cottonseed oil.

In the test procedure 200±10 grams of cottonseed oil was placed in the Pyrex glass reactor. Hydrogen flow at a rate of 750±50 cc. per minute was begun. The catalyst was carefully weighed out to the nearest milligram and when the temperature of the cottonseed oil reached 295±3° F. a 5 cc. sample was removed by a medicine dropper and its refractive index measured in a refractometer at a temperature of 48.0±0.1° C. The catalyst was then added to the cottonseed oil and timing was commenced immediately. Samples were taken at various time intervals and the refractive index thereof measured and plotted on a graph. From the graph the time required to reduce the refractive index of cottonseed oil 0.0051 is determined. This value (expressed in minute) is the activity value of the catalyst. Values below 20 minutes represent an active catalyst. Values above 20 minutes represent a relatively inactive catalyst.

The addition of the zirconium improved the initial activity of the catalyst from 28 to 22 minutes and improved the selectivity from a Tucker number of 9.9 to 2.8. Similar catalyst containing 4%, 7% and 10% zirconium (calculated as zirconium metal) showed improved selectivity with no change in initial activity.

The invention is further disclosed by the following examples which are provided for purposes of illustration only. It will be understood by those skilled in the art that various modifications in operating conditions may be made without departing from the invention as herein disclosed.

More specifically, in the foregoing description reference has been made to the formation of basic zirconium carbonate as a part of the complex precipitate which occurs when the initial solution containing zirconium and nickel or cobalt ammine ions is treated to effect precipitation. Actually, because a complex precipitate is involved, it is not known whether the precipitated zirconium is actually a carbonate, an oxide, or a hydroxide, or combination complex, for the precipitated forms of the other metals effectively mask the zirconium and make a definite determination of its form impossible. Moreover, in the foregoing description reference is made to the inclusion of a calcination step to convert the precipitated metal complex into the oxide form prior to the hydrogen reduction step, which next occurs. In the hydrogen reduction step, it is preferable to reduce the active metals to an intermediate degree, for if the reduction is carried out to too great an extent a catalyst of less than optimum activity may result. In most instances, a degree of reduction equivalent to between 50% and 80% of completion is preferred. If desired, the calcination step may be eliminated, for the desired removal of carbonate will be brought about during the subsequent reduction with hydrogen.

EXAMPLE 1

To 11,105 ml. of water was added 3084 ml. of ammonium hydroxide solution (28.6% $NH_3$) with agitation. Then, 5000 grams of nickel powder (99.9% Ni, 0.1% Co, 0.006% Fe and 0.012% S) was added while the solution was vigorously agitated, followed by 1275 grams of ammonium bicarbonate. The resulting solution contained 7.5% $NH_3$ and 5.0% $CO_2$. A stream of oxygen was blown through the solution by means of a stainless steel sparger near the bottom of the vessel at the rate of approximately 7 liters per hour. The mixture was maintained at 90–100° F. and blown with oxygen for 21–29 hours. A blue nickelammine carbonate solution containing 5.4 grams of nickel per 100 ml. was formed. The solution was decanted from the excess nickel powder into a stainless steel container. 810 grams of finely divided kieselguhr were added to the nickelammine carbonate solution with good agitation, followed by 437.6 grams of ammonium zirconyl carbonate solution (10% $ZrO_2$, equivalent to 32.4 grams of zirconium) which was added to the nickelammine carbonate solution. A stream of live steam was blown into the bottom of the vessel through a ¼ inch stainless steel tube to remove part of the ammonia and carbon dioxide. The temperature was raised to 204–210° F. in approximately ¼ hour and was maintained until the precipitation of nickel as basic nickel carbonate was substantially complete and the mother liquor was only slightly blue in color. The mixture was filtered while still hot and the precipitate was calcined without washing at 650° F. The calcined powder was then ground in a Waring Blendor and part of it (50 g.) was charged to a glass reduction tube and reduced for two hours with hydrogen at 950° F. at a rate of 0.7 cubic foot per hour. The temperature in the catalyst bed was maintained constant by means of internal monitoring at the top and bottom of the catalyst bed through a series of thermocouples connected to a temperature-control device. The glass tube containing the catalyst was taken out of the furnace at around 400° F. and under hydrogen flow 200 grams of molten hydrogenated cottonseed flakes were added. The slurry was mixed well and poured onto a stainless steel plate to cool. The hardened catalyst flakes were then ground in a Waring Blendor and then stored with no further precautions against oxidation of the catalyst by air. This catalyst contained approximately 49% nickel, 49% kieselguhr and 2% zirconium dioxide.

*Test procedure*

The activity of the reduced nickel hydrogenation catalysts were determined by standard method SM–C–213 of the American Oil Chemists Society. The re-use and iodine values of the hydrogenation catalysts which are determined by standard methods SM–C–21f and SM–C–21b, respectively. The selectivity index (Tucker No.) is determined by the following procedure: 200 grams of soya oil is hydrogenated at 295° F. in the presence of 0.05% nickel catalyst, based on the weight of the oil. Hydrogenation is continued until the iodine value (I.V.) of the soya oil has been reduced to about 80. The percent solids at 21.1° C. is determined by method No. Cd–10–57 of the American Oil Chemists Society. Results obtained are substituted in the following formula to obtain the selectivity index (Tucker No.):

Tucker No.=(I.V. −80)+(percent solids at 21.1° C. −7.0)

A Tucker No. of 2.0 indicates excellent selectivity; between 2.0 and 4.0 indicates good selectivity; between 4.0 and 5.0 indicates fair selectivity; between 5.0 and 6.0 indicates poor selectivity; and over 6.0 is unacceptable.

A series of catalysts are prepared in accordance with the procedure of Example I with variations in the relative amount of zirconium, calcining temperatures, and reduction temperatures. In Table I below is presented a summary of the data on the effect of calcination temperature on the activity of the zirconium-promoted nickel hydrogenation catalyst. This catalyst was promoted with 2% zirconium, was calcined for 16 hours and was reduced with hydrogen at 950° F.

TABLE I

| Calcination Temp., ° F. | Percent Reduction | Activity at 295° F. (min.) | Tucker No. |
|---|---|---|---|
| 250 | 52.1 | 30.5 | 11.5 |
| 450 | 49.6 | 32.5 | 9.8 |
| 650 | 50.0 | 22 | 2.8 |
| 850 | 63.4 | 23 | 8.6 |

In Table II are presented data showing the effect of the reduction temperature on the activities of a catalyst promoted with 2% zirconium in the hydrogenation of cottonseed oil. The catalyst had been calcined at 650° F. for 16 hours and all runs were made over a hydrogenation period of 2 hours.

TABLE II

| Reduction Temp., ° F. | Percent Reduction | Activity at 295° F. (min.) | Tucker No. |
|---|---|---|---|
| 750 | 31.9 | 20 | 5.1 |
| 950 | 50.0 | 22 | 2.8 |
| 1050 | 79.3 | 25 | 3.1 |

The data in Table II indicate that catalysts reduced at higher temperature are more selective, although the activities are about the same.

In Table III is a summary of the effect of various concentrations of zirconium on the activity and selectivity of the nickel hydrogenation catalysts. All catalysts were calcined at 650° F. for 16 hours and reduced at 950° F. for two hours.

TABLE III

| Percent Zr | Percent Reduction | Initial Activity (min.) 255° F. | Initial Activity (min.) 295° F. | Tucker No. | Reuses |
|---|---|---|---|---|---|
| 0 | 66.1 | 35 | 21 | 2.7 | 13 |
| 0.5 | 62.8 | 39 | 21 | 4.7 | 11 |
| 1 | 55.3 | 35 | 19 | 2.8 | 19 |
| 2 | 69.0 | 34 | 20 | 2.9 | 18. |
| 4 | 77.5 | 27 | 18 | 0.9 | 19 |
| 7 | 71.6 | 31 | 19 | −0.5 | 17 |
| 10 | 73.8 | 28 | 19 | 0.6 | 14 |

The data indicate that increasing the zirconium content greater than 2% increases the activity and provides better selectivity.

In Table IV data are presented on the effect of the addition of 2% zirconium on the activity and selectivity of a nickel hydrogen catalyst.

TABLE IV

| Calcination T., °F. | Reduction T., °F. | Zirconium, percent | Reduction, percent | Initial Activity (min.) | | Tucker No. |
|---|---|---|---|---|---|---|
| | | | | 255° F. | 295° F. | |
| 250 | 950 | 0 | 64.2 | +60 | 34 | 17.5 |
| 250 | 950 | 2 | 52.1 | +60 | 30.5 | 11.5 |
| 450 | 950 | 0 | 46.5 | +60 | 32 | 12.8 |
| 450 | 950 | 2 | 49.6 | 50 | 32.5 | 9.8 |
| 650 | 950 | 0 | 55.5 | 33 | 20.5 | 2.1 |
| 650 | 950 | 2 | 61.6 | 30 | 18 | 3.5 |
| 650 | 950 | 0 | 54.9 | +60 | 28 | 9.9 |
| 650 | 950 | 2 | 50.0 | 30 | 22 | 2.8 |
| 850 | 950 | 0 | 38.6 | +60 | 30 | 10 |
| 850 | 950 | 2 | 63.4 | 36 | 23 | 8.6 |

The above data indicate that a catalyst of poor activity (greater than 20 minutes) is improved in activity and selectivity by the addition of 2% zirconium. The data also show that a zirconium-promoted catalyst is active in the hydrogenation of cottonseed oil at a lower temperature (255° F.) in comparison to a similar catalyst without zirconium.

EXAMPLE 2

A solution of cobaltammine carbonate was produced as follows: Eighteen liters of an aqueous ammonium carbonate solution containing 5% $NH_3$ and 6.8% $CO_2$ was produced by dissolving ammonium carbonate in water and adding aqua ammonia (28.6%) thereto. This solution was placed in an earthenware vessel, warmed to 80°–90° F. and agitated. To it was added 3.2 kilograms of cobalt powder and the mixture was agitated and maintained at 80°–90° F. for a period of 24 hours during which a stream of air at a flow rate of 6–8 liters per hour was passed through it by means of a tube extending nearly to the bottom of the crock. After 24 hours the solution contained 1.6% cobalt and approximately 9% of the cobalt powder had dissolved.

Ammonium zirconyl carbonate solution was prepared by mixing 200 grams of dry ammonium bicarbonate (low sulfate content) with 500 grams of hydrous zirconium carbonate (20.9% $ZrO_2$) in a Waring Blendor, then transferring the mixture to a beaker in which it was stirred and heated to 60°–65° C. with 400 ml. of water. A small amount of water was used to wash out the Waring Blendor and was added to the mixture in the beaker. When the temperature reached 60° C. a clear solution formed rapidly and some carbon dioxide was evolved. The final clear solution contained 10–12% Zr, depending upon the amount of wash water used.

The cobaltammine carbonate solution was mixed with sufficient ammonium zirconyl carbonate solution to form a solution containing 4% zirconium, based on the amount of cobalt in the solution. Then a quantity of diatomaceous silica equal to one-third of the amount of cobalt in the solution was added and the mixture was agitated and heated with live steam for a period of an hour, thereby evaporating ammonia and carbon dioxide and causing precipitation of basic cobalt and zirconium carbonates on the silica. The silica bearing the metal carbonates was removed by filtration and calcined at 650° F. for 16 hours. A yield of 95% (based on the amount of cobalt in the starting solution) was obtained.

200 grams of the calcined product was placed in a Sigma mixer and mixed for 15 minutes with 800 cc. of 5% polyvinyl alcohol solution (2% PVA by weight of catalyst) diluted to 1800 cc. with water. The product was dried in an oven at 120°–140° F. for 16 hours, passed through a 10-mesh screen, admixed with 3% graphite and air dried for 5 hours. The catalyst was slugged into ¼" pellets, passed through a 10-mesh screen and formed into 3/16"×⅛" pellets. The pellets were calcined as follows:

2 hours at 250° F.
1 hour at 450° F.
1 hour at 650° F.
6 hours at 750° F.

Catalysts prepared as above contained 55–60% cobalt, 2.2–2.4% zirconium and 0.0% to 1.0% nickel (depending upon the purity of the cobalt). The pellets had an average DWL crush strength of 4.3 lbs., with a high of 8 lbs. and a low of 2 lbs., and a bulk density of 75.1 lbs./cu. ft.

Prior to use as a hydrogenation catalyst, the pellets were treated with hydrogen at 950° F. to reduce the cobalt oxide to cobalt metal in highly active, catalytic form. The zirconium oxide ($ZrO_2$) in the catalyst is not reduced, and serves as promotor in its oxide form. This catalyst is particularly effective in the hydrogenation of organic nitriles to primary amines without significant formation of secondary amines.

The activity of cobalt catalysts was determined by a micromethanation procedure wherein carbon monoxide was reduced to methane with gaseous hydrogen in the presence of the catalyst. Catalyst pellets (3/16" by ⅛") to be tested were placed in a ½" diameter stainless steel reactor 19 inches long in an electric furnace. Ten cubic centimeters of catalyst was charged to the methanation reactor and the catalyst was reduced for 8 hours with moist hydrogen at 750° F. and an hourly space velocity of 1000, the temperature being maintained at 750±1° F. When powdered catalyst is tested 2.0 cc. volume is used. Then a stream of gas containing 1% carbon monoxide in hydrogen was substituted for the hydrogen stream. The activity tests were conducted with the carbon monoxide-hydrogen gas stream at an hourly space velocity of 5000, atmospheric pressure, 350°±1° F. The percent conversion of carbon monoxide to methane is determined by measuring by the carbon monoxide content of the effluent gas stream. Activity data for cobalt catalysts in accordance with the foregoing procedure are shown in the Table V, the percentage conversion of carbon monoxide to methane being a measure of the activity of the catalyst.

TABLE V

[Activities of cobalt catalysts at 350° F., pellets 3/16" x ⅛"]

| Catalyst composition: | Percent conversion |
|---|---|
| 55–60% Co, 2.2% Zr, PVA binder | 94 |
| 55–60% Co, 2.2% Zr, PVA binder | 93 |
| 55–60% Co, 2.2% Zr, PVA binder | 94 |
| 55–60% Co, PVA binder | 86 |
| 55–60% Co, PVA binder | 89 |
| 55–60% Co, PVA binder | 89 |

I claim:
1. A method of producing a hydrogenation catalyst containing zirconium oxide and a catalytic metal of the group consisting of nickel and cobalt which comprises forming an aqueous solution containing ammonium zirconyl carbonate and a member of the group consisting of nickelammine carbonate and cobaltammine carbonate, wherein the catalytic metal content is in the range of 0.1% to 5% by weight and the zirconium content is in the range of 2% to 10% of the weight of the catalytic metal content, evaporating sufficient ammonia and carbon dioxide from the solution to cause the coprecipitation of zirconium basic carbonate and a basic carbonate of the catalytic metal of the group consisting of nickel and cobalt, removing the precipitate of mixed metal basic carbonates and calcining said precipitate at a temperature in the range of 250° to 1000° F. for a time sufficient to convert the basic carbonate of the metal of the group consisting of nickel and cobalt to the corresponding catalytic metal oxide and the zirconium basic carbonate to zirconium dioxide, and reducing said catalytic metal oxide to a catalytic metal by reaction with hydrogen at a temperature in the range of 500° to 1100° F.

2. The method of claim 1 wherein the metalammine carbonate of the metal selected from the group consisting of nickel and cobalt is produced by reacting an aqueous solution containing 6% to 15% ammonia by weight and 4% to 10% carbon dioxide by weight with a metal selected from the group consisting of nickel and cobalt in the presence of oxygen at a temperature in the range of 80°–100° F.

3. Method of claim 1 wherein an inert carrier is suspended in the solution of metallammine carbonate of a metal selected from the group consisting of nickel and cobalt and ammonium zirconyl carbonate prior to the evaporation of ammonia and carbon dioxide.

4. A method of producing a catalyst containing zirconium oxide and a catalytic metal of the group consisting of nickel and cobalt which comprises forming an aqueous solution containing ammonium zirconyl carbonate and a member of the group consisting of nickelammine carbonate and cobaltammine carbonate, wherein the catalytic metal content is in the range of 0.1% to 5% by weight and the zirconium content is in the range of 2% to 10% of the weight of the catalytic metal content, evaporating sufficient ammonia and carbon dioxide from the solution to cause the coprecipitation of the basic carbonates of zirconium and a catalytic metal of the group consisting of nickel and cobalt, and reducing the zirconium-catalytic metal precipitate to render the catalytic metal active.

5. A method of producing a hydrogenation catalyst containing zirconium oxide and a catalytic metal of the group consisting of nickel and cobalt which comprises forming an aqueous solution containing ammonium zirconyl carbonate and a member of the group consisting of nickelammine carbonate and cobaltammine carbonate, wherein the catalytic metal content is in the range of 0.1% to 5% by weight and the zirconium content is in the range of 2% to 10% of the weight of the catalytic metal content, reducing the relative concentrations of ammonia and carbon dioxide in the solution by evaporation to cause the coprecipitation of zirconium basic carbonate and a basic carbonate of the catalytic metal of the group consisting of nickel and cobalt, removing the precipitate from the solution and reducing the catalytic metal basic carbonate in said precipitate to a catalytic metal by reaction with hydrogen at a temperature in the range of 500° to 1100° F.

References Cited by the Examiner
UNITED STATES PATENTS

| | | | |
|---|---|---|---|
| 2,564,331 | 8/1951 | Hawley | 252—472 |
| 2,696,475 | 12/1954 | Farrow | 252—472 |
| 3,133,029 | 5/1964 | Hoekstra | 252—466 |

MAURICE A. BRINDISI, *Primary Examiner.*